(12) United States Patent
Vargas et al.

(10) Patent No.: US 10,167,727 B2
(45) Date of Patent: Jan. 1, 2019

(54) GAS TURBINE ENGINE BLADE CONTAINMENT SYSTEM

(71) Applicant: UNITED TECHNOLOGIES CORPORATION, Farmington, CT (US)

(72) Inventors: Chris Vargas, West Hartford, CT (US); Robert Russell Mayer, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 413 days.

(21) Appl. No.: 14/794,576

(22) Filed: Jul. 8, 2015

(65) Prior Publication Data

US 2016/0047255 A1 Feb. 18, 2016

Related U.S. Application Data

(60) Provisional application No. 62/036,677, filed on Aug. 13, 2014.

(51) Int. Cl.
*F01D 5/30* (2006.01)
*F01D 5/14* (2006.01)
(Continued)

(52) U.S. Cl.
CPC .......... *F01D 5/3061* (2013.01); *B22F 3/1055* (2013.01); *B22F 7/08* (2013.01); *B23K 9/044* (2013.01); *B23K 9/232* (2013.01); *B23K 15/0086* (2013.01); *B23K 15/0093* (2013.01); *B23K 26/0006* (2013.01); *B23K 26/342* (2015.10); *C23C 4/08* (2013.01);
(Continued)

(58) Field of Classification Search
CPC ........ F01D 25/24; F01D 21/045; F01D 5/143; F05D 2230/30
See application file for complete search history.

(56) References Cited

U.S. PATENT DOCUMENTS 4,411,589 A * 10/1983 Joubert ................. F01D 21/045
415/121.2
4,666,371 A * 5/1987 Alderson .............. F01D 21/045
415/197
(Continued)

FOREIGN PATENT DOCUMENTS

EP 1087105 A2 3/2001
EP 1726788 A2 11/2006
(Continued)

OTHER PUBLICATIONS

EP Search Report for Application No. 15180645.2-1610; dated Dec. 10, 2015; 5 pgs.
(Continued)

*Primary Examiner* — Carlos A Rivera
*Assistant Examiner* — Thuyhang Nguyen
(74) *Attorney, Agent, or Firm* — Cantor Colburn LLP (57) ABSTRACT

A gas turbine engine blade containment system is disclosed. The blade containment system may include a generally cylindrical casing being made of a first material, and a generally cylindrical ring being made of a second material coaxially surrounding the casing, at least some portion of the ring metallurgically bonded to the casing.

4 Claims, 5 Drawing Sheets

(51) Int. Cl.
| | |
|---|---|
| *F01D 21/04* | (2006.01) |
| *F01D 25/24* | (2006.01) |
| *B23K 26/342* | (2014.01) |
| *B22F 3/105* | (2006.01) |
| *B22F 7/08* | (2006.01) |
| *B23K 9/04* | (2006.01) |
| *B23K 9/23* | (2006.01) |
| *B23K 15/00* | (2006.01) |
| *B23K 26/00* | (2014.01) |
| *C23C 4/08* | (2016.01) |
| *C23C 4/12* | (2016.01) |
| *F02C 3/10* | (2006.01) |
| *C23C 4/126* | (2016.01) |
| *B23K 101/00* | (2006.01) |
| *B23K 103/04* | (2006.01) |
| *B23K 103/10* | (2006.01) |
| *B23K 103/14* | (2006.01) |
| *B23K 103/18* | (2006.01) |
| *B33Y 10/00* | (2015.01) |

(52) U.S. Cl.
CPC .............. *C23C 4/12* (2013.01); *C23C 4/126* (2016.01); *F01D 5/143* (2013.01); *F01D 5/147* (2013.01); *F01D 21/045* (2013.01); *F01D 25/24* (2013.01); *F02C 3/10* (2013.01); *B23K 2101/001* (2018.08); *B23K 2103/04* (2018.08); *B23K 2103/05* (2018.08); *B23K 2103/10* (2018.08); *B23K 2103/14* (2018.08); *B23K 2103/18* (2018.08); *B23K 2103/26* (2018.08); *B23K 2201/001* (2013.01); *B23K 2203/04* (2013.01); *B23K 2203/05* (2015.10); *B23K 2203/10* (2013.01); *B23K 2203/14* (2013.01); *B23K 2203/18* (2013.01); *B23K 2203/26* (2015.10); *B33Y 10/00* (2014.12); *F05D 2230/30* (2013.01); *F05D 2230/312* (2013.01); *Y02T 50/671* (2013.01)

(56) References Cited

U.S. PATENT DOCUMENTS

| | | | | |
|---|---|---|---|---|
| 4,718,818 A | * | 1/1988 | Premont | F01D 21/045 415/121.2 |
| 4,902,201 A | * | 2/1990 | Neubert | F01D 21/045 138/110 |
| 6,365,222 B1 | * | 4/2002 | Wagner | C23C 24/04 148/537 |
| 6,394,746 B1 | * | 5/2002 | Sathianathan | F01D 21/045 415/173.4 |
| 2011/0179805 A1 | | 7/2011 | Chatelois et al. | |

FOREIGN PATENT DOCUMENTS

| | | |
|---|---|---|
| EP | 2602582 A2 | 6/2013 |
| WO | 2014130158 A1 | 8/2014 |

OTHER PUBLICATIONS

S. Stecker, K.W. Lachenberg, H. Wang and R.C. Salo, "Advanced Electron Beam Free Form Fabrication Methods & Technology", Session 2: Electron Beam Welding, 35-49, Sciaky Incorporated, Chicago, Illinois, USA.

Karen M.B. Taminger and Robert A. Hafley, "Electron Beam Freeform Fabrication: A Rapid Metal Deposition Process", Proceedings of the 3$^{rd}$ Annual Automotive Composite Conference, Sep. 9-10, 2003, Society of Plastic Engineers, Troy, MI, USA.

Karen Taminger, "Electron Beam Additive Manufacturing: State-of-the-Technology, Challenges & Opportunities", Direct Digital Manufacturing Workshop, May 11-12, 2010, Solomons, MD.

"Laser Deposition Technology (LDT)", Additive Manufacturing, Innovative Solutions.

"Invenstigation of the Benefits of Plasma Deposition for the Additive Layer Manufacture of Ti-6AI-4V", Journal of Materials Processing Technology, pp. 1377-1386,vol. 212, Issue 6, Jun. 2012.

"Heavy Metal", The Economist, May 3, 2014, pp. 1-3, Berlin.

Martin Lamonica, "Additive Manufacturing", MIT Technology Review, Apr. 23, 2013.

"Cold Metal Transfer", The Technology, Battery Charging Systems/ Welding Technology/Solar Electronics.

"Laser Freeform Manufacturing Technology (LFMT)" RPM Innovations, Inc.

European Office Action for Application No. 15 180 645.2 dated Aug. 1, 2017.

* cited by examiner

GAS TURBINE ENGINE BLADE CONTAINMENT SYSTEM

CROSS-REFERENCE TO RELATED APPLICATION

This Application is a non-provisional patent application claiming priority under 35 USC § 119(e) to U.S. Provisional Patent Application Ser. No. 62/036,677 filed on Aug. 13, 2014.

FIELD OF THE DISCLOSURE

This disclosure generally relates to gas turbine engine blade containment systems, and more specifically relates to gas turbine engine blade containment systems having a casing made of a first material coaxially surrounded by a ring made of a second material.

BACKGROUND OF THE DISCLOSURE

Gas turbine engines are well known internal combustion engines typically used to provide thrust to an aircraft or to provide power for land-based operations. Generally speaking, a gas turbine engine includes a fan, a compressor, a combustor and a turbine arranged in a serial fashion. The fan draws in ambient air as it rotates and moves it to the compressor where the air is compressed or pressurized. The compressed air is then communicated to the combustor where it is mixed with fuel and ignited. The products of the combustion are hot gases which are then directed into the turbine. This causes the airfoils in the turbine to rotate, and as turbine is mounted on the same shaft, or shafts, as the compressor and fan, this causes the compressor and fan to rotate as well. Accordingly, once started, it can be seen that the operation of the engine is self-sustaining in that the combustion of more fuel causes more rotation of the turbine and in turn the compressor and the fan. Moreover, the rotation of the fan, which typically has a diameter many times that of the compressor and the turbine, causes the engine to generate thrust.

In order to increase operational efficiency, and thereby decrease fuel consumption, new gas turbine engine designs require the turbine section casings to operate at greater temperatures than ever before. This means that the casing of new gas turbines must be made of materials that are more resistant to heat than the legacy substances they are substituting. However, the casing must also have sufficient resilience to resist foreign object damage and contain blade liberation. Foreign object damage is a constant concern of the aerospace industry, as any impingement of ice, water, sand, dirt, animals (e.g., birds) and other foreign objects found in the air or on the ramps, taxiways and runways of airports can damage the turbine section of the engine and in turn detrimentally affect thrust generation.

One way to increase resistance to foreign object damage is by increasing the thickness of the casing. However, while increasing the thickness of the casing improves its resilience to foreign object damage, the increased thickness also increases the mass of the engine, and thereby offsets the efficiency gained by operating the engine at elevated temperatures. Thus, while certain gas turbine engine blade containment systems are known, improvements to the aforementioned areas of mass and resilience to foreign object damage are desired, all while maintaining the increased efficiency obtained when operating the engine at increased temperatures.

SUMMARY THE DISCLOSURE

In accordance with one aspect of the present disclosure, a gas turbine engine blade containment system is disclosed. The containment system may include a generally cylindrical casing being made of a first material and a generally cylindrical ring made of a second material coaxially surrounding the casing. At least some portion of the ring may be metallurgically bonded to the casing.

In a refinement of the blade containment system, the containment system may further include a generally cylindrical second ring comprising a third material axially spaced apart from the ring, at least some portion of the second ring metallurgically bonded to the casing.

In another refinement of the blade containment system, the second material and third material are the same.

In another refinement of the blade containment system, the second material and third material are different.

In another refinement of the blade containment system, the containment system may further include a gap positioned between the casing and the ring.

In another refinement of the blade containment system, the containment system may further include a sheet metal core positioned between the casing and the ring.

In another refinement of the blade containment system, the containment system may further include a rib connected to at least some portion of the sheet metal core and extending through the ring.

In another refinement of the blade containment system, the containment system may further include metallic foam positioned between the casing and the ring.

In accordance with another aspect of the present disclosure, a gas turbine engine is disclosed. The gas turbine engine may have a fan section, a compressor section downstream from the fan section, a combustor section downstream from the compressor section and a turbine section downstream from the compressor section. The turbine section may include a blade containment system. The blade containment system may include a generally cylindrical casing being made of a first material and a generally cylindrical ring made of a second material coaxially surrounding the casing. At least some portion of the ring may be metallurgically bonded to the casing.

In a refinement of the gas turbine engine, the blade containment system may include a generally cylindrical second ring being made of a third material axially spaced apart from the ring, at least some portion of the second ring metallurgically bonded to the casing.

In another refinement of the gas turbine engine, the second material and third material are the same.

In another refinement of the gas turbine engine, the second material and third material are different.

In another refinement of the gas turbine engine, the blade containment system may further include a sheet metal core positioned between the casing and the ring.

In another refinement of the gas turbine engine, the blade containment system may further include a rib connected to at least some portion of the sheet metal core and extending through the ring.

In another refinement of the gas turbine engine, the blade containment system may further include a gap positioned between the casing and the ring.

In another refinement of the gas turbine engine, the blade containment system may further include metallic foam positioned between the casing and the ring.

In accordance with another aspect of the present disclosure, a method for manufacturing a gas turbine engine blade containment system is disclosed. The method may include the steps of providing a generally cylindrical casing being made of a first material, then depositing a second material onto the casing that coaxially surrounds the casing to form a ring, at least a portion of the ring metallurgically bonded to the casing.

In a refinement of the method for manufacturing a gas turbine engine blade containment system, the depositing process may be selected from the group consisting of electron beam melting, electron beam wire deposition, direct metal laser sintering, selective laser sintering, laser beam powder deposition, selective laser melting, cold metal transfer, gas dynamic cold spraying, high velocity oxy-fuel coating spraying (HVOF) and combinations thereof.

In another refinement of the method for manufacturing a gas turbine engine blade containment system, the first material may be selected from the group consisting of titanium, titanium alloy, nickel, nickel alloy, steel, aluminum, aluminum alloy and combinations thereof.

In another refinement of the method for manufacturing a gas turbine engine blade containment system, the second material may be selected from the group consisting of titanium, titanium alloy, nickel, nickel alloy, steel, aluminum, aluminum alloy and combinations thereof.

These and other aspects and features of the present disclosure will be more readily understood when read in conjunction with the accompanying drawings.

DETAILED DESCRIPTION OF THE DISCLOSURE

Figure 1:
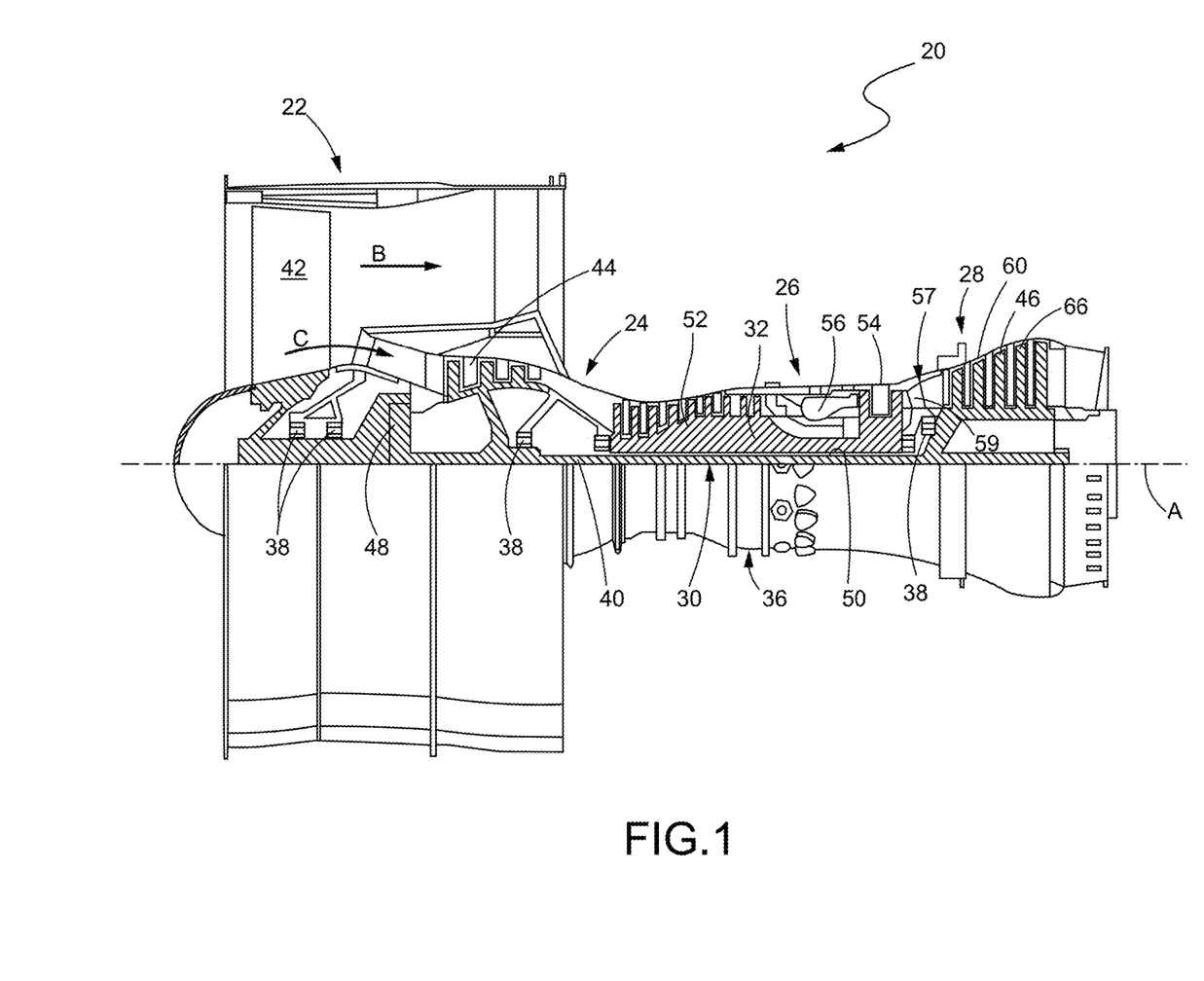
FIG. 1 is a side, partially cross-sectional view of a gas turbine engine constructed in accordance with the present disclosure.

Referring now to the drawings, and with specific reference to FIG. 1, a gas turbine engine is shown and generally referred to be reference numeral 20. The gas turbine engine 20 disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustion section 26, the compressor air is mixed with fuel and ignited, with the resulting combustion gases then expanding in turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures as well.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan blade assembly 42, a low pressure (or first) compressor section 44 and a low pressure (or first) turbine section 46. The inner shaft 40 is connected to the fan blade assembly 42 through a geared architecture 48 to drive the fan assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 50. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
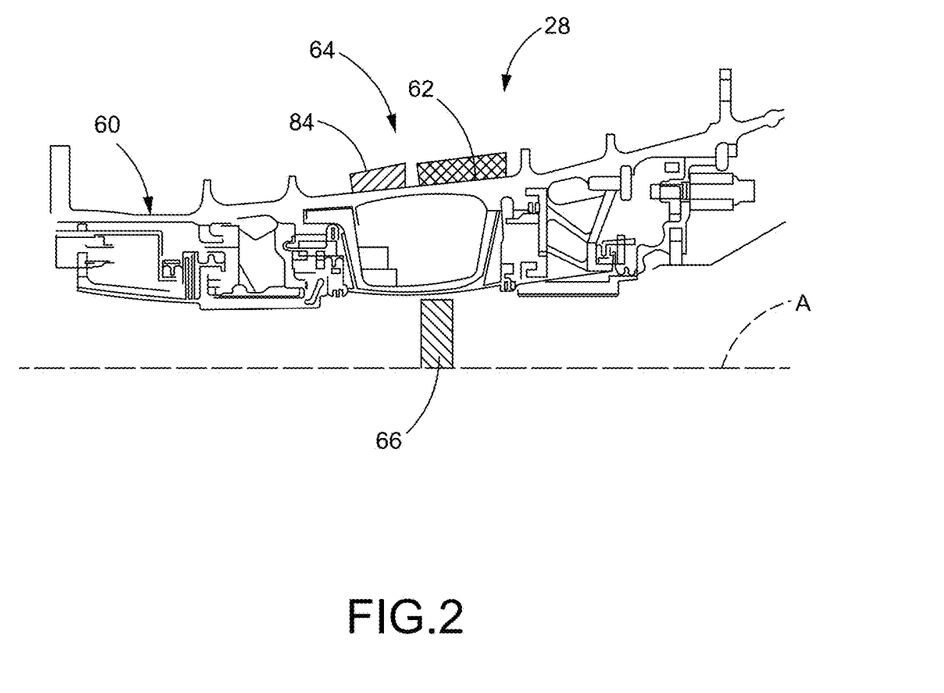
FIG. 2 is a side, enlarged cross-sectional view of a turbine section of the engine of FIG. 1 including a blade containment system manufactured in accordance with the present disclosure

Now turning to FIGS. 1-2, the turbine section 28 may further include a casing 60 that extends forward towards compressor section 24 and fan section 22, and rearwards away from the turbine section along axis A. The turbine section 28 may also include a ring 62. The casing 60 and ring 62 in combination may make a blade containment system 64 constructed in accordance with the present disclosure.

The casing 60 may generally be cylindrical in shape and surround turbine section 28. Ring 62 may be generally cylindrical in shape and may coaxially surround casing 60. Ring 62 may be positioned along axis A such that it lies in a plane containing a turbine blade 66. Alternatively, ring 62 may be positioned along axis A such that it lies in a plane containing two or more turbine blades 66. Thus, ring 62 may have a varying width such that it lies in a plane containing only one blade 66, or it may have a width such that it lies in a plane containing two or more blades 66.

The casing 60 may be made of a first material including, but not limited to, metal and metal alloys. The metals from which casing 60 may be made include, but are not limited to, titanium, nickel and aluminum. While the following list is not exhaustive, the metal alloys from which casing 60 may be made include titanium alloys, nickel alloys, aluminum alloys and steel. Some examples of nickel alloys that may be utilized include, but are not limited to, WASPALOY®, INCONEL 718®, INCONEL 718+®, INCONEL 939®, and HAYNES 282®. Some examples of titanium alloys that may be utilized include Ti-6A1-4V and Ti-6A1-2Sn-4Zr-2Mo. Some examples of aluminum alloys that may be utilized include series 2000, 6000 and 7000 aluminum. Examples of steel that may be utilized include series 300 and 400 stainless steel, and precipitation hardenable stainless steel. As would be understood, the choice of the material for the casing may be determined based on the appropriate operating temperature of the gas turbine engine.

Figure 3:
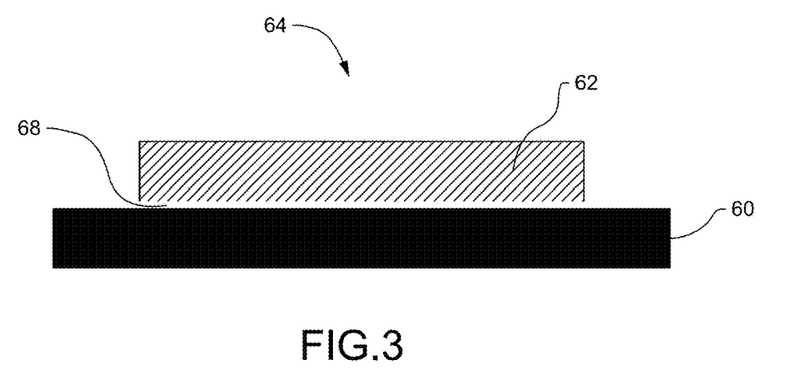
FIG. 3 is a side, enlarged cross-sectional view of a blade containment system disclosed in FIG. 2.

Now with reference to FIG. 3, the ring 62 of blade containment system 64 may be metallurgically bonded 68 to casing 60. The metallurgical bond 68 is different than a mechanical bond such as where the ring 62 is physically fastened to casing 60, or where the ring is shrink fit over the casing by cooling the casing and heating the ring. The metallurgical bond discussed herein may include, but is not necessarily limited to, diffusion welding, fusion welding or sintering. Per the American Society for Metals Handbook, diffusion welding is high temperature solid-state process that permanently joins faying surfaces by simultaneous application of pressure and heat, and does not involve macroscopic deformation, melting or relative motion of parts. In fusion welding, a filler metal and base metal (substrate), or base metal only, are melted together to complete a weld. In additive manufacturing techniques, the filler metal is added to the surface of the base metal (substrate) in repeating layers. In sintering, the bonding of adjacent surfaces in a mass of particles by molecular or atomic attraction on heating at high temperatures below the melting temperature of any constituent in the material is undertaken. Sintering strengthens a powder mass and normally produces densification and, in powdered metals, recrystallization.

Figure 4:
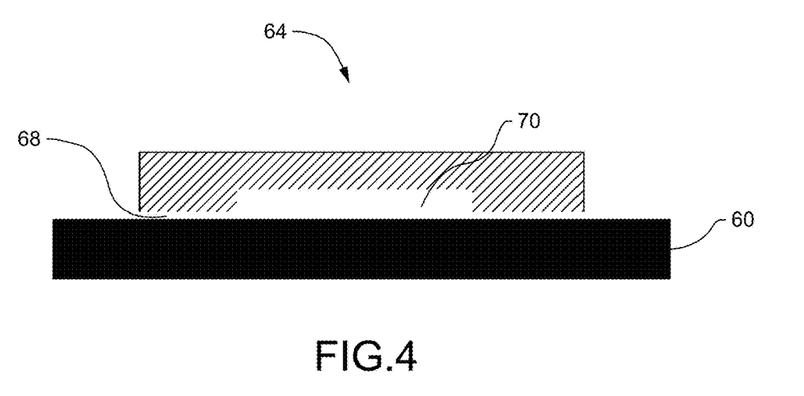
FIG. 4 is a side, enlarged cross-sectional view of a second configuration of the blade containment system disclosed in FIG. 2.

However, this may not be the only bonding configuration that ring 62 may take. As demonstrated in FIG. 4, in an alternative embodiment, the blade containment system 64 may further include a gap 70 positioned between ring 62 and casing 60. Thus, in this instance, at least some portion of ring 62 may be metallurgically bonded 68 to casing 66, though not all of the ring may be bonded to the casing. The gap 70 may be included to further incorporate another material between casing 60 and ring 62, to provide a non-linear rate of energy dissipation across the blade containment system 64, to provide air flow for the removal of heat from the gas turbine engine, or even provide a space for instrumentation. Moreover, gap 70 has no limitations with respect to its shape, as the shape may be dependent upon its functional use as a channel for air or for non-linear energy dissipation, and one shape may have better properties for one function than another.

Figure 5:
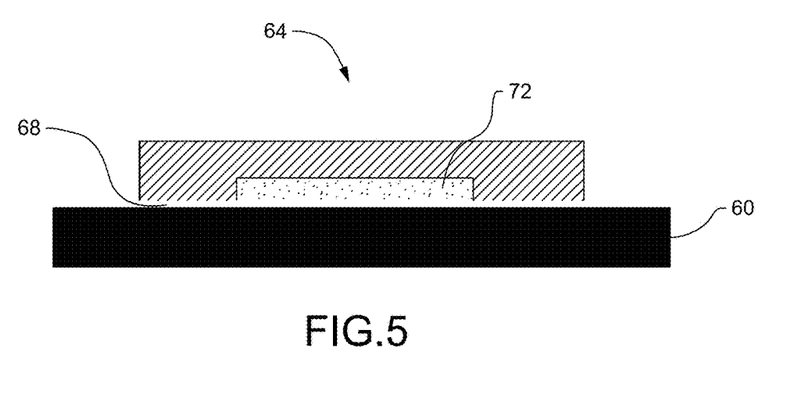
FIG. 5 is a side, enlarged cross-sectional side view of a third configuration of the blade containment system disclosed in FIG. 2.

Further, in an alternative example, the blade containment system 64 of the present disclosure may further include a metallic foam 72 positioned between casing 60 and ring 62 as demonstrated in FIG. 5. Metallic foam is a material having an open cell structure made of metal that includes pores filled with gas. In one example the metallic foam 72 that may be used in blade containment system 64 may be made of aluminum. In an alternative example, the metallic foam 72 may be made of an aluminum alloy. In further examples, the metallic foam 72 may be made from titanium, titanium alloy, nickel, nickel alloy and steel. The foregoing list of materials from which metallic foam may be made is not mean to be exhaustive and is only representative. As such, other materials not disclosed herein may be utilized for the metallic foam 72 used in the blade containment system 64 disclosed herein.

Additionally, metallic foam 72 may be used in containment system 64 to increase the rate of heat transfer from casing 66, or even non-linearly dissipate energy across the blade containment system. Since the foam 72 may be used to alter the rate of energy dissipation across blade containment system 64, it may thus also be incorporated into the system 64 such that both foam 72 and gap 70 are positioned between the casing 60 and ring 62 (not shown). In this instance the foam 70 is positioned next to casing 60 thereby helping to increase the rate of heat transfer from casing 60 and while providing a differential rate of energy dissipation across containment system 64. The shape of the containment ring to accommodate either the metallic foam or the gap may be superior to a monolithic ring since the foam or the gap may increase the compliance of the ring assembly in the axial and radial directions. This applies to both pressure loads and thermal loads. This compliance reduces the local stress concentrations that could be associated with the edges/ends of a monolithic ring, and improves the life of the part while maintaining containment capability and reducing the weight of the part.

Figure 6:
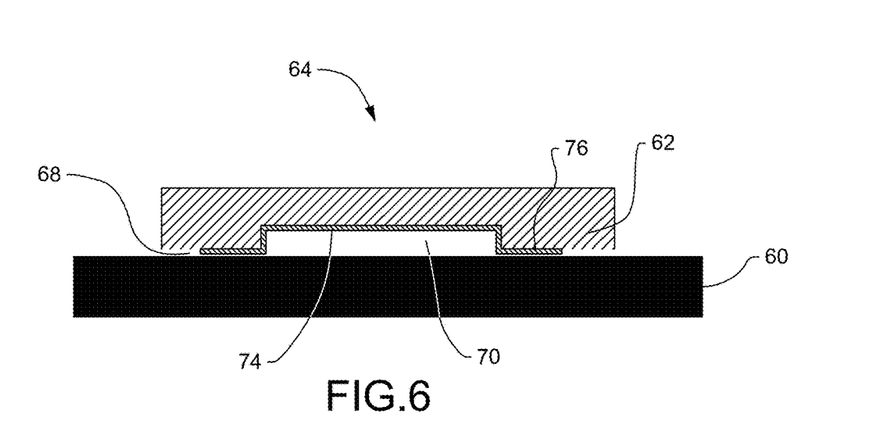
FIG. 6 is a side, enlarged cross-sectional side view of a fourth configuration of blade containment system disclosed in FIG. 2.

Referring now to FIG. 6, in an additional example the blade containment system 64 may further include a sheet metal core 74 positioned between the casing 60 and ring 62. Sheet metal core 74 may be made of metal or metal alloys. Examples of metals from which the sheet metal core may be made include aluminum, titanium and nickel. Examples of metal alloys from which the sheet metal core may be made include aluminum alloys, steel , nickel alloys and titanium alloys, such as series 2000, 6000 or 7000 aluminum, 300 and 400 series stainless steels, precipitation hardenable stainless steels, Ti-6A1-4V, Ti-6A1-2Sn-4Zr-2Mo, WASPALOY®, INCONEL 718®, INCONEL 718+®, INCONEL 939® or HAYNES 282®. The sheet metal core 74 may increase the rate of heat transfer from casing 60. Moreover, this instantiation of the blade containment system 64 may further include a gap 70 positioned between the casing 60, ring 62, and sheet metal core 74. Thus, in this example, the sheet metal core 74 may further include a leg 76 such that only a portion of the core 74 may be in contact with the casing 60 and ring 62, thereby incorporating gap 70 into blade containment system 64. The gap 70 may be used to provide a channel for air or to locate instrumentation for controlling or monitoring the operation of the gas turbine engine.

Figure 7:
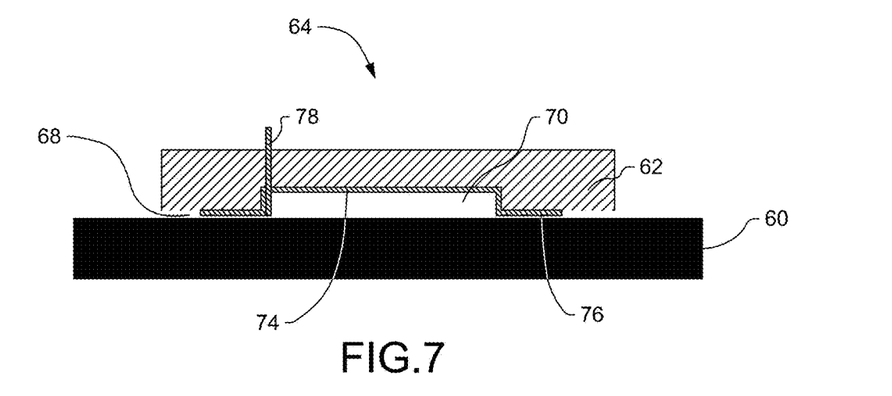
FIG. 7 is a side, enlarged cross-sectional side view of a fifth configuration of the blade containment system disclosed in FIG. 2.

Moving onto FIG. 7, the containment system 64 can further include a rib 78 that may be connected to sheet metal core 74 and that may extend through ring 62. The rib 78 may be made from the same material as sheet metal core 74, outlined above. The rib 78 may be provided to increase the transfer of heat away from casing 60, and may be additionally utilized to provide a location for the mechanical attachment of instrumentation for the control of, or the monitoring the operation of, the gas turbine engine of the present disclosure. Additionally, the rib may be provided to carry external hardware such as fuel, oil, or air tubes, electrical harnesses and wiring, etc.

Figure 8:
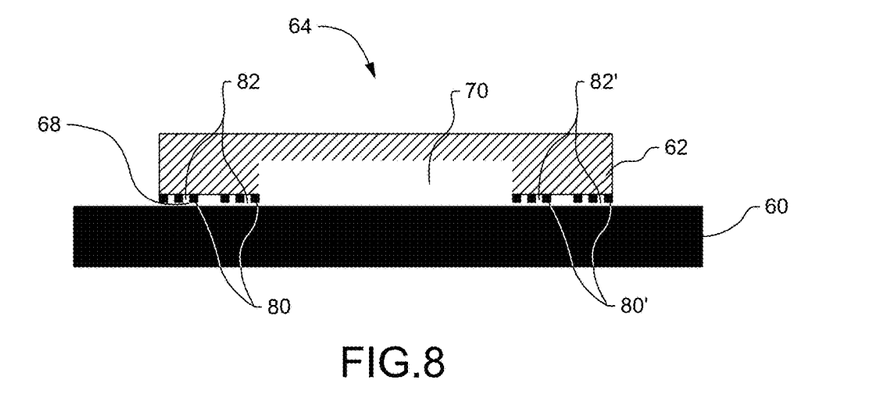
FIG. 8 is a side, enlarged cross-sectional side view of a sixth configuration of the blade containment system disclosed herein disclosed in FIG. 2.

In an additional embodiment within the present disclosure, the containment system 64 may include one or more standups 80 as demonstrated in FIG. 8. The at least one standup 80 may be positioned intermediate the casing 60 and the ring 62 such that the ring is not in direct contact with the contact with the casing, thereby insulating the ring from the increased operating temperature of new gas turbine engine designs. Moreover, each such standup 80 may be metallurgically bonded 68 to both the casing 60 and the ring and may be made from the same or different material than both the casing 60 and ring 62. In one example, the containment system may include at least on standup 80. In a further example, the containment system 64 may include at least two standups 80 spaced apart from each other. In a further example, the containment system may include three standups 80 each spaced apart from each other. As the number of standups metallurgically bonded to both the ring 82 and casing 66 increases, the resilience of the blade containment system 64 to meet blade containment requirements may also increase.

While still referring to FIG. 8, blade containment system 64 may further include a gap 70 that may be positioned between ring 62 and the casing 60. Furthermore, gap 70 may be positioned between primary standups 80 and secondary standoffs 80'. Moreover, this containment system may further include sub-gaps 82 positioned between two or more spaced apart standups 80 or 80'.

Now while taking reference to the blade containment system discussed herein, and FIGS. 2-8, ring 62 may be made of a second material which includes, but is not limited to, metal and metal alloy. Metals which may be used to manufacture ring 62 include titanium, nickel, steel and aluminum, although this list is not meant to be exhaustive. Metal alloys from which ring 62 may be made include titanium alloys, nickel alloys, aluminum alloys and steel. Some examples of nickel alloys that may be utilized include, WASPALOY®, INCONEL 718®, INCONEL 718+®, INCONEL 939® or HAYNES 282®. Examples of the aluminum alloys that may be used include series 2000, 6000 or 7000 aluminum. Steels that may be used include 300 and 400 series stainless steel, or precipitation hardenable stainless steels. Titanium alloys that may be used include Ti-6A1-4V and Ti-6A1-2Sn-4Zr-2Mo. Just as with the list of metals disclosed above, neither the list of metals or alloys disclosed is meant to be exhaustive. Instead, the lists are meant to be representative of materials that may be utilized for the construction of ring 62.

The specific choice of material that is utilized to construct ring 62 may be based on the design of the containment system 64. Thus, when incorporating a metallic foam 72 into the containment system 64 (such as FIG. 5), the choice of the second material utilized to construct ring 62 may be different than in the instance where only a gap 70 is positioned between ring 62 and casing 64 (such as FIG. 4) since a metallic foam may provide different energy dissipation characteristics through the containment system. Moreover, the choice of material utilized to construct ring 62 may be made based not only on its ability to dissipate energy through the containment system 64, but may also be chosen due to its ability to withstand the higher operating temperatures necessary to obtain the increased operating efficiency discussed herein.

With reference to FIGS. 1-2, and in accordance with another embodiment of the disclosure, the containment system 64 may also include a second ring 84. The second ring 84 may be generally cylindrical in shape, may coaxially surround casing 60 and may be axially spaced apart from ring 62 along axis A. In an example, second ring 84 is axially spaced apart from ring 62 in turbine section 28 and may be placed in a plane containing a turbine blade 66. In an alternative example, second ring 84 is axially spaced apart from ring 62 and may be positioned in compressor section 24 wherein it may be placed in a plane containing a compressor blade (not shown), or placed in the plane of a fan blade in fan section 22 (not shown).

Now with reference to FIGS. 2-8, second ring 84 may have the same configuration as any one of those disclosed in these aforementioned figures. Further, second ring 84 may include their elements. In addition, ring 84 may be made from the same materials as ring 62. However, ring 84 need not be made of the same material as ring 62. For example, if ring 84 is placed in compressor section 24, where it may experience lower temperature than if placed in turbine section 28, it may not be required to utilize the same material as would be required in the elevated temperature environment of the turbine section.

Figure 9:
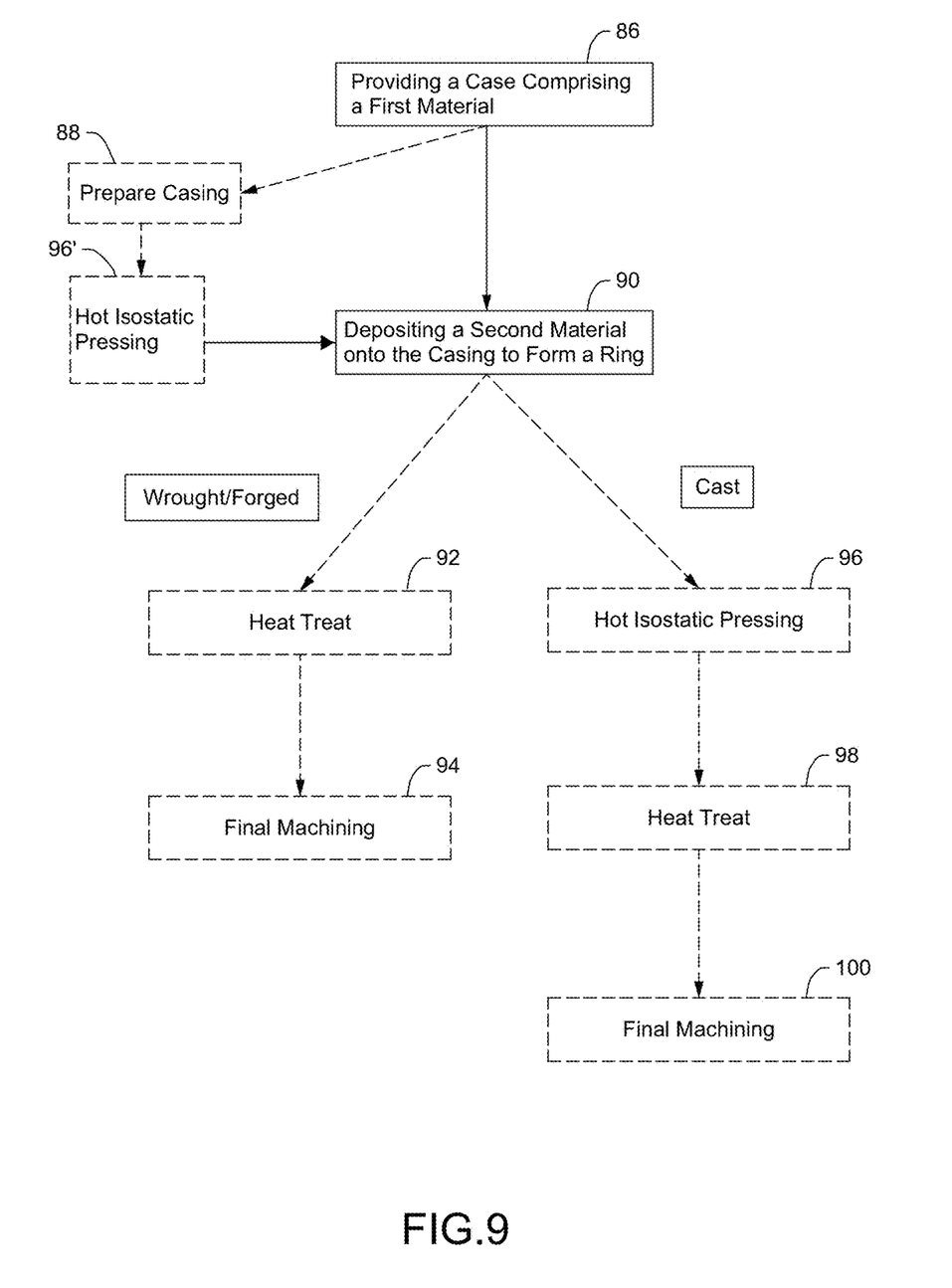
FIG. 9 is a flowchart depicting a sample sequence of steps which may be practiced in accordance with a method of manufacturing a blade containment system of the present disclosure.

While the foregoing describes a gas turbine engine 20 and a blade containment system 64, the present disclosure also recites methods for making a blade containment system for a gas turbine engine. An embodiment of the method is depicted in the flowchart of FIG. 9. As shown in this chart, the method may include a first step of providing a casing made of a first material 86. Then, in a second step 90, a second material may be deposited onto the casing to form a ring. The ring may coaxially surround the casing and at least some portion of the ring may be metallurgically bonded to the casing.

In an additional, although not necessary, step 88 the casing may be prepared for the subsequent depositing a second material onto the casing step 90. In one example of this optional step, a sheet metal core, and any attached ribs if utilized, may be welded or brazed onto the casing, and then the second material may deposited onto the casing such that the sheet metal core is positioned between the casing and the ring, and any ribs extend through the ring. In an additional example, the metallic foam is laid onto or attached to the casing such that it is positioned between the casing and the ring once the second material is added onto the casing to form the ring. In another example, the standups are welded or brazed onto the casing before the deposition of the second material to form the ring. In a further instance, the stand-ups are formed on the casing by one or more of the same manufacturing methods discussed below in regards to the deposition of the ring in step 88, before depositing the second material to form the ring. Then, the standups may be positioned intermediate the casing and the ring.

Subsequent the depositing step 90, additional optional steps may also be incorporated into the method of manufacturing a blade containment system. If the casing provided is wrought manufactured, then subsequent to the deposition step 90, the blade containment system may be heat treated in step 92 to improve the metallurgical bond formed between the casing and the ring during the deposition step. Following heat treatment step 92, the containment system may be machined to final specifications in step 94.

If the casing provided is a cast manufactured, then the containment system may be treated with hot isostatic pressing (HIP) in the optional step 96. As further shown in FIG. 9, if preparing the casing step 88 is undertaken, then optional HIP step 96' may also be undertaken before the depositing step 90. Furthermore, if preparing step 88 is undertaken then the system may be treated with HIP at both optional steps 96, 96'. HIP is a process utilized to decrease the porosity of materials by squeezing the material with equal pressure from all sides. This equal squeezing decreases the porosity of the material under treatment thereby increasing the material's density. This is useful when forming a containment system because the increased density improves the system's resilience to foreign object damage. Subsequent to HIP, a cast casing may be heat treated in additional elective step 98 to improve the metallurgical bond formed between the casing and the ring during the deposition step. Following the heat treatment step 98, the system may be machined to final specifications in step 100.

The depositing the second material onto the casing to form the ring step 88 may be undertaken with a variety of methods. In one example, electron beam melting may be utilized. Electron beam melting is a process where a metal or metal alloy powder is melted with an electron beam in a layer-by-layer additive process. Thus, a layer of metal or metal alloy (e.g., titanium or titanium alloy) may be deposited onto the casing, and then an electron beam is utilized to melt the material to the casing. In another example, electron beam wire deposition may be utilized to deposit the ring onto the casing. In electron beam wire deposition a wire made of metal or metal alloy (e.g., titanium, titanium alloys, nickel or nickel alloy) is continuously fed into the path of an electron beam that is in close physical proximity to the casing, thereby melting the material onto the casing. The beam and wire combination may be moved in the X, Y or Z planes to create the ring in an additive process.

In a further example, direct metal laser sintering may be used to deposit the ring onto the casing. In direct metal layer sintering, a metal or metal alloy powder is sintered together with a laser beam in a layer-by-layer additive process. Thus, a layer of metal or metal alloy (e.g., titanium, titanium alloy, nickel or nickel alloy) may be deposited onto the casing, and then the laser is utilized to coalesce and sinter together the metal or metal alloy powders. In a close cousin to direct metal laser, selective laser sintering may also be used to deposit the ring. In selective laser sintering, a granular bed of metal or metal alloy powder (e.g., titanium, titanium alloy, nickel or nickel alloy), and then a laser is used to selectively fuse the powder together. Then, another layer of powder is added and the process is repeated. Selective laser melting may also be used. In selective maser melting, which is similar to selective laser sintering, a granular bed of metal or metal alloy powder (e.g., titanium, titanium alloy, nickel or nickel alloy), is laid down then then a laser is used to melt, rather than fuse, the powder granules together. Then, another layer of powder is added and the process is repeated. In another cousin to direct metal laser sintering, laser beam powder deposition may be used. Laser beam powder deposition is a process in which metal powder is injected into the focused beam of a high-power laser under tightly controlled atmospheric conditions. The focused laser beam melts the surface of the target material and generates a small molten pool of based material. The powder delivered to this spot is absorbed into the melt pool, thus generating a deposit thereby building a feature.

Next, cold metal transfer may be used to construct the ring. The cold metal transfer process is an engineered cousin of arc welding in which a filler metal repeatedly moves into and out of a weld pool. Moving the filler metal into the weld pool extinguishes the arc between the filler metal and the substrate, while moving the filler metal out of the pool regenerates the arc thereby melting more fill material for addition to the melt pool. Cold metal transfer is a gas metal arc welding (GMAW) process where the filler metal moves into and out of the weld pool, repeatedly forming and extinguishing the arc.

Additionally, gas dynamic cold spraying may be used to deposit the ring onto the casing. In gas dynamic cold spraying, metal or metal alloy powders are entrained in a high velocity gas stream, both of which then impinge the surface to be worked on. During impact with the surface the power particles undergo a plastic deformation and the particles adhere to the surface without any melting of the particles. Then, another layer of powder may be added to the previous layer. Heat treating may be used to improve the metallurgical bond between the powder and the casing, and between the powder particles themselves.

Finally, high velocity oxy-fuel coating spraying (HVOF) may be utilized to deposit the ring onto the casing. Like gas dynamic cold spraying, metal or metal alloy powders are entrained in a high velocity gas stream. However, in HVOF the gas stream is at an elevated temperature around the melting temperature of the powder. Thus, unlike gas dynamic cold spraying, the powder partially melts in the gas stream, and thus when the powder particles impinge the surface of the material to be worked upon, not only do the particles adhere due to plastic deformation, they also melt and fuse with the surface and with each other. Then, another layer of powder may be added to the previous layer.

What now follows are four examples demonstrating methods of making a blade containment system for a gas turbine engine in accordance with the method disclosed herein. In a first example of a method of making a blade containment system for a gas turbine engine, a casing made of wrought HAYNES 282® is provided. Next, the blade containment ability of the wrought casing is enhanced by depositing a ring of INCONEL 718® coaxially around the outside of the casing via the additive manufacturing process electron beam wire deposition. Finally, the metallurgical bond between the casing and the ring may be improved by a hybrid heat treatment process wherein the system is heated at a preselected temperature, followed by being cooled at a rate of air cooled or faster, and ending with a precipitation heat treating at a chosen temperature.

In an additional example of the method of making a blade containment system for a gas turbine engine, a casing made of cast HAYNES 282® is provided. Next, the blade containment ability of the cast casing is enhanced by depositing a ring of INCONEL 718® coaxially around the outside of the casing via the additive manufacturing process high velocity oxy-fuel coating spraying (HVOF). Next, the casing and ring are subjected to Hot Isostatic Pressing (HIP) to close pore porosity and enhance the metallurgical bond between the HAYNES 282® and INCONEL 718®. Finally, the metallurgical bond between the casing and the ring may be further improved by a heat treatment process wherein the system is heated to a preferred temperature, cooled at a rate of air cool or faster and followed by precipitation heat treatment at a selected temperature.

In another example of the method for making a blade containment system for a gas turbine engine, a casing made of cast WASPALOY® is provided. Then, the blade containing capacity of the casing is improved by depositing a ring of INCONEL 718® coaxially around the casing by the additive manufacturing process laser powder deposition. Subsequently, the casing and the added ring are treated by HIP to close porosity and promote the metallurgical bond formed between the WASPALOY® and INCONEL 718®. Finally, the casing and system is heat treated to the WASPALOY® process wherein the system is heated to a preferred temperature, followed by cooling at a rate of air cooled or faster, followed with a stabilization heat treatment at a selected temperature and cooled at a rate of air cooled or faster, and rounded out with precipitation heat treatment at a selected temperature.

In a further example of the method of making a blade containment system for a gas turbine engine, a cast INCONEL 939® casing is provided. Then a ring of INCONEL 718® is deposited onto the casing so that it coaxially surrounds the casing with the electron beam wire additive manufacturing process. Next, the casing and the added ring are treated by HIP to close porosity and promote the metallurgical bond formed between the INCONEL 939® and INCONEL 718®. Finally, the casing and system is heat treated to the INCONEL 939® process whereby the system is heated to a preselected temperature, followed by cooling at rate of air cooled or faster, followed with a stabilization heat treatment at selected temperature and cooled at a rate of air cooled or faster, and ending with a precipitation heat treatment at a chosen temperature.

INDUSTRIAL APPLICABILITY

In operation, the blade containment system of the present disclosure can find applicability in many industrial settings including, but not limited to, gas turbine engines for use in aircraft. More specifically, various gas turbine engine blade containment systems are disclosed. The blade containment systems disclosed herein have a generally cylindrical casing being made of a first material, and a generally cylindrical ring being made of a second material coaxially surrounding the casing, at least some portion of the ring metallurgically bonded to the casing. The casing made of a first material allows the engine to operate at higher temperature thereby increasing efficiency, while the ring made of a second material coaxially surrounding the casing increases the engine's blade containment capability for a given system weight.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A method for manufacturing a gas turbine engine blade containment system, comprising:
   providing a cylindrical casing being made of a first material; and
   depositing a second material onto the casing that coaxially surrounds the casing to form a ring, at least a portion of the ring metallurgically bonded to the casing and a gap positioned between the casing and the ring, wherein a sheet metal core is positioned between the casing and the ring and a rib is connected to at least some portion of the sheet metal core and extending through the ring.

2. The method of claim 1, wherein the depositing is step is one of; electron beam melting, electron beam wire deposition, direct metal laser sintering, selective laser sintering, laser beam powder deposition, selective laser melting, cold metal transfer, gas dynamic cold spraying, high velocity oxy-fuel coating spraying (HVOF) and combinations thereof.

3. The method of claim 1, wherein the first material is selected one of; titanium, titanium alloy, nickel, nickel alloy, steel, aluminum, aluminum alloy and combinations thereof.

4. The method of claim 1, wherein the second material is one of; titanium, titanium alloy, nickel, nickel alloy, steel, aluminum, aluminum alloy and combinations thereof.

* * * * *